United States Patent Office

3,546,110
Patented Dec. 8, 1970

3,546,110
METHOD AND APPARATUS FOR TREATING SEWAGE WATER BY MEANS OF FLOCCULATION AND AERATION
Sixten Englesson, Djursholm, and Sven Gustaf Yngve Gamer, Norrkoping, Sweden, assignors to Stenberg-Flygt AB, Solna, Sweden, a corporation of Sweden
Filed May 31, 1968, Ser. No. 733,536
Claims priority, application Sweden, June 2, 1967, 3,326/68
Int. Cl. C02c 1/12
U.S. Cl. 210—5                                         5 Claims

ABSTRACT OF THE DISCLOSURE

Sewage water is purified by flocculating it using regenerated sludge as flocculating substance, by enriching and stagnating the sludge and by aerating the same by means of a uniform laminar air flow spread out over the main part of the bottom of a sludge chamber, said air flow giving a large relative movement between each individual air bubble and the sludge particles.

---

Figure 1:
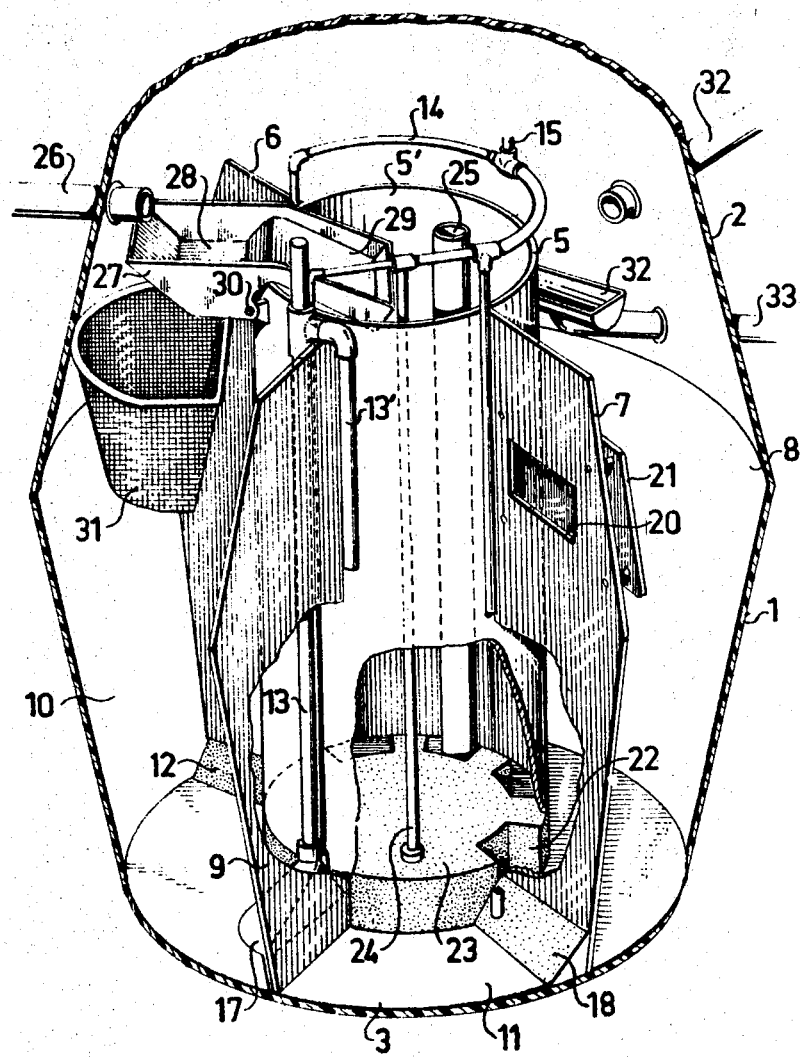

The main component of the aerobic flocculating process is the flocculation substance generator which replaces the digester in the anaerobic process. Viewed hydrauically said generator is connected in a corresponding manner at the side of the main water flow.

The function of the digester tank is to take charge of separated sludge, neutralize and remove the same. Separation of sludge and water in the main water flow is incomplete if chemical flocculation is not used. In the former instance the digester only receives a portion of suspended and dissolved substance, which should be removed from the water.

The flocculating substance generator or precipitate substance generator creates, under favourable conditions, a highly adsorptive flocculating agent, which when returned to the main water flow precipitates the turbidity of the water and certain dissolved substances. The floc is formed nuder well known conditions, essentially by stirring slowly. It is known from the operation of waterworks that a number of tanks connected in series with varying stirring intensity give the lowest remaining turbidity of the water phase. Aeration, when adapted in a certain manner, gives similar results. The sludge phase is then separated in the settling tank—no filtering is required—and returns to regeneration. Settling is effected so much more rapidly when flocculating than when not flocculating that the sum of the flocculating and settling volume is lower—in any event not greater—than when solely deflocculating non-deflocculating water.

When attempting to find ways of improving the treatment of sewage water by means of flocculation it should be noted that the reaction rate of the biological oxidation process, evident from the BOD-diagram (BOD is the biochemical oxygen demand necessary for converting the biochemical substances present in the treated water), cannot be affected, but is determined by the temperature. This concerns the relative rate, which means that at given temperatures a certain portion of total BOD is decomposed over a certain time, eg. 67% after 5 days at 20° C. When varying the concentration the absolute BOD-decomposition is affected in proportion to the concentration. The quantity of bacteria necessary for the conversion is clearly formed for each substrate concentration and temperature. Thus, if the conclusion should be drawn from these laboratory tests, an optimal concentration of substrate and biological material should be maintained. One method of providing such a rise in concentration would be the application of a flocculating substance. This is seldom applied, however, for cost reasons. It is expensive in systems used in practice to obtain theoretically the duration of stay for the BOD time sequence for the full mass of water. If it were possible to deflocculate the sludge rapidly by aeration, the clarified water could be allowed to depart and the sludge then treated during the necessary period of time at reasonable costs.

This is what happens in conventional systems, but the age of the sludge is usually restricted to, for instance, 3 days—(sludge age = being equal to the number of days, during which the sludge is exposed to bacterial decomposition under the application of oxygen).

After this time has passed, a third of the sludge is removed each day (whereupon a portion of newly arrived sludge is also removed) and usually introduced into a digester where the aerobic sequence is interrupted and replaced by an anaerobic process. (In this connection about ⅔ of BOD departs in gas form as methane $CH_4$ and carbon dioxide $CO_2$.) The albumin is decomposed partly to ammoniac (or ammonium bicarbonate) $NH_4OH + NH_4 \cdot HCO_3$. The phosphorus is converted substantially to $HPO_4$-ions.

The drawbacks associated with conventional methods are that the systems are technically complicated (pre-sedimentation, aeration plants, separation plants for the sludge, similarly expensive digester which in one known process must be heated to about 30° C. and in another process to about 50° C.). Furthermore, it is necessary to tap the sludge surplus in the form of digested sludge. The disadvantage associated with the departing sludge water remains.

Stabilization aerators have also been designed, where the excess of sludge in the active sludge process is not removed until a relatively long time has passed by. Examples of other systems are:

(1) The Netherland ring channels.
(2) Swedish one-day aerators.
(3) Agitation aerator systems etc.

In all of these instances attempts have been made to extend the sludge age, but it is often found that the system in this instance requires more oxygen than has been accessible.

By leading away a considerably smaller amount of BOD with the surplus sludge, BOD is accumulated and thereby a higher load on the system is obtained, which results in that the air and the oxygen do not reach the inner portions of the floc particles of sludge. Consequently, instead of obtaining an aerobic process in the interior of the floc, an anaerobic process is obtained.

Consequently, when considering such a plant of conventional design it is found that when the oxidation capacity is relatively high, there is a deficiency of oxygen in the sludge, in spite of the fact that the water phase is partly saturated with oxygen. (The efficiency of the oxygen supply means decreases in proportion with the supply of oxygen, i.e. air is introduced into a mass of water which is already supplied with oxygen.)

The problem which exists is thus to introduce oxygen to the interior of the floc without it being necessary to pass a highly oxygenized water phase.

Attempts have been made to solve these difficulties by restricting the BOD-load per unit volume (water or system) and also the load per unit weight sludge in the system, with the intention of obtaining a sludge concentration in the system assumed to be favourable for oxygenizing of the sludge. The prominent research scientist Eckenfelder in the USA has discovered, purely empirically, that the concentration of sludge in a number of existing systems does not increase above 3000–5000 gram of dry substance per m.$^3$ aerated sludge volume, and simultaneously gives as standard that the BOD-load should suitably be restricted to not more than 0.2 kg. BOD 5 d. 20° per kg. dry substance in the system.

Thereby a maximum limit is placed on the BOD-load per m.$^3$ of, for instance, 5 kg./m.$^3 \times 0.2 = 1$ kg. BOD/m.$^3$d.

For ring channels this is given as up to and including 0.2 kg. BOD/m.$^3$d.

It is true that if these recommendations are followed a satisfactory oxygenation of the sludge is obtained, but the systems are bulky and expensive and the sludge surplus obtains, of course, a high water content, is voluminous and requires expensive dewatering arrangements.

The present invention eliminates the aforementioned disadvantages. The invention is based upon the new conception that oxygenizing of the sludge particles is by no means promoted by low BOD-content or sludge concentration in the water phase.

On the contrary, the tests made by the inventors have shown that the water phase about the floc particles constitutes a diffusions-preventing interface around said particles, which makes transport of oxygen to the bacteria difficult, which cooperate with the oxidation of the floc particles. Said interface also obstructs the removal of decomposition products caused by the bacteria activity during the oxidation process.

The invention is thus mainly concerned with providing a method according to which instead of aerating incoming sewage water intermixed with activated sludge, enriched or recovered, relatively stationary sludge is aerated, i.e. sludge presenting no rotary motion, and by providing for among others for a uniform laminar air flow caused by spreading out the aeration over the main part of the bottom of the sludge container to arrange for the aeration of the sludge to provide a high relative movement between each individual air bubble and the sludge particles, so that good contact between the interface of the air bubbles and the sludge particles is obtained. This is opposed to known sludge aeration systems, where the main thought is placed upon a roller-like movement of the sludge rotating with the air stream, which gives little relative movement between the sludge particles and the air bubbles.

The invention also comprises enriching the sludge of the sewage water and collecting it in an aeration tank, bringing a substantial portion of the sludge volume into contact with an essentially vertical stream of air bubbles of such nature that the maximum diffusion effect between bubbles and sludge particles is obtained, in that provision is made to ensure that for a given volume of sludge the effect of the total surface of the air bubbles, the relative speed of the bubbles and the air turbulence inside the bubbles is an optimum.

According to a particularly active variation of the method according to the invention an air speed is chosen of $v = Q/A$, where Q is the quantity of injected air in m.$^3$/h., A is the section of the sludge volume subjected to aeration, and $v$ is at least 10 m.$^3$/h. and at most 100 m.$^3$/h.

According to a further characteristic feature of the invention there is also utilized iron hydrate concentration Fe(OH)$_3$ of at least 20 mol./m.$^3$ (at 30° C.) aerated tank by natural enrichment from incoming water, so that an optimal concentration of microorganisms is obtained, which results in an unloaded floc presenting good sorption properties, and which permits the chemical precipitation of phosphorus (P) in the iron hydrate and which can also absorb impurities even when presenting small amounts.

In order to understand the process correctly it should be known that the phosphates in the sewage water may substantially arrive from domestic kitchen water, one third, from toilets, one third, and the remaining third from synthetic detergents. Calculated absolutely approximately 3 g. phosphorus/person and day are involved, i.e. 1 g./person of each of the afore-mentioned types of water from the households.

The phosphorus is retained physically by mechanical adsorption in the sludge against the sludge particles, whereby the condition that the phosphorus shall be retained in the sludge being that the iron hydrate Fe(OH)$_3$ is present in the correct proportions in the mixture of incoming sewage water and activated sludge.

In actual fact new iron is found in the supplied sewage water in an amount of 1 g./person a day, which means that a constant ratio between iron and phosphorus can be maintained.

This ratio of 1:3 is of significance in order that the trivalent iron is capable of attracting the phosphorus containing particles of sludge, and thus free the sewage water from the phosphorus.

The method thus entails binding the phosphorus by substances developed by the own flocculation of the sewage water, and separating the phosphorus from the water by converting the same first to floc and then to sludge, where the phosphorus is thus held fixed.

The following figures show the normal content of ash and fibers in normal sewage water per person and day. It has previously been mentioned that one has a 1 g. Fe and 3 g. P (which generally appears as PO$_4$); in washing powder often as polyphosphates or the like.

In order to obtain corresponding figures/liter it is only necessary to distribute this amount over the water consumption. 9 g. PO$_4$ thus contains 3 g. P. Furthermore, about 5 g. of paper fiber/person and day are obtained.

An example is given below of a calculation of the absolute quantity paper fiber/volume of water: If one departs from a starting point of 5 g. paper fiber/person and day this gives for 50 persons 50 g./day.

The corresponding amount of water is ⅓ m.$^3$/person and day.

When conversion is effected via flocculation and sludge grains 150 g./m.$^3$ paper fiber is obtained on the first day.

If the expression sludge age, according to above $Q/q$ is introduced 100 days sludge aging by flocculation gives accumulation to a concentration of 15000 g./m.$^3$ sludge, an absolute quantity of sludge of 5000 g./⅓ m.$^3$.

The given method can also be said to distinguish from known biological purifying processes because in the latter varying amounts of incoming sewage water are accepted and work is carried out with constant sludge circulation per unit of time, i.e. variable sludge concentration, the supply of regenerated sludge to the variable quantity of sewage water thus being held constant.

According to another variation of the present invention the quantity of regenerated sludge which is fed to the incoming sewage water as flocculation agent comprises a specific portion of the sewage water, suitably reaching up to 10–20% by volume by the most.

Figure 2:
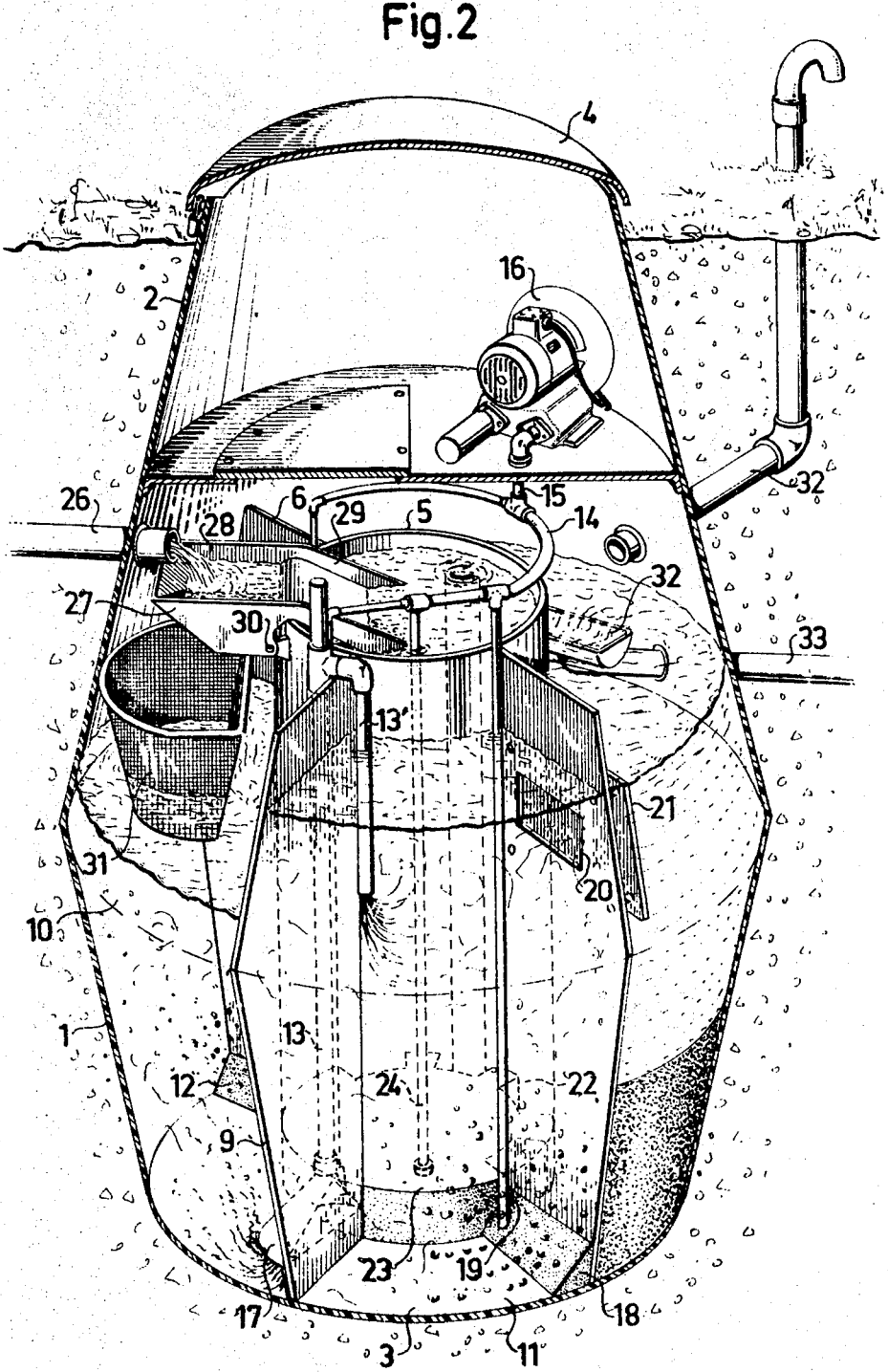

The method according to the invention will now be described more in detail in connection with an embodiment which is suitable for a small sewage water aerating system which is shown on the enclosed drawings, in which FIG. 1 shows the most important parts of the system, before the system has been put into operation, while FIG. 2 shows a cross-section of a treatment system according to the invention in operation.

In addition to the aforementioned observations the following observations are also of significance when elaborating a method according to the invention:

The reason why the sludge is aerated instead of the water is that, according to the German research scientist Geiger, the absorption of oxygen from an air bubble in water has already taken place after ¼ sec. The water around the bubbles is thus already saturated with oxygen. In this respect it can be asked whether it is expedient to break down the sludge in order to facilitate aeration.

However, two important observations must be placed on the aeration of sewage sludge:

(1) There must be flocculation in order for the sludge to sink.
(2) A high adsorption is desired between the bacteria culture and the sludge, and when viewed from this point no coagulation or flocculation is desired. Thus, these two functions are opposed to one another. Consequently, conventional methods, where aeration and flocculation are effected in the same tank, are not rational or purposeful.

Water treatment methods according to the invention thus present a system which is executed preferably as an integrated unit and comprising a mixing equalizing or buffer tank for accommodating the incoming sewage water, a flocculating tank where activated or regenerated sludge serves as the flocculating agent, a sedimentation tank for concentration or enrichment of the sludge and separation of the water phase, and a regeneration tank for activating the enriched sludge. Preferably these are designed in an integrated unit comprising a mixing-buffer chamber, a flocculating chamber, a sedimentation chamber and a regenerating chamber. The water treatment system has thus a total of at least four chambers.

An air lift pump is further arranged between the sedimentation and regeneration chambers in the form of openings in the wall between the chambers and areation cushions in the regeneration chamber, and air lift action through the aeration cushions. Arranged between the buffer and flocculation chambers is a second air lift pump. Said first-mentioned chamber may thus also serve as equalizing chamber upon a sudden inflow of fluid.

The wall between the flocculating chamber and the sedimentation chamber is also provided with an opening, preferably somewhat below the water level which is determined by the spillway in the sedimentation chamber.

In order to supply a fixed amount of regenerated sludge to the incoming sewage water a metering arrangement is situated between the buffer chamber or flocculating chamber and the regeneration chamber, the metering arrangement suitably being in the form of a tiltable scoop, for instance a double scoop, where the one scoop is filled with running sewage water while the other one is immersed into the regenerated sludge. The mutual volume of the scoop is adjusted according to the desired concentration of sludge in the sewage water. The volume which can be removed by the smaller scoop reaches to between ⅓ and ¼ of the volume of the larger scoop.

The integrated system is preferably formed in the shape of a circular well, in which the regeneration chamber forms a cylindrical inner room, where remaining chambers form outer rooms in the shape of a segmented ring.

As can be seen from the figures, the casing of the treatment system is comprised of two truncated conical cylinders 1 and 2, which have been positioned one on top of the other and with the flaring edges turned towards each other, whereafter they have been lowered into the ground. Thus, a well is formed in which the different chambers of the system are arranged. The walls of the well conceived as being made of a reinforced glass fiber material and the bottom may also be designed of the same material, and securely adhered to the wall. The top of the well is provided with a cover 4.

As is best seen from FIG. 1, a tubular body 5 is arranged in the well space, concentric with the center axis of the well and which forms the regenerating chamber 5' of the system. The walls of the regenerating chamber may also be made of reinforced glass fiber material.

The annular room about the regenerating chamber is divided into two portions by vane-shaped walls 6 and 7, extending diametrically from said walls out towards the walls of the well, said walls 6 and 7 being secured to the outer side of the regenerating chamber and to the inside of the well wall, and of which two portions, the one situated farthest away from the sedimentation chamber 8 of the treatment system. The portion of the well space nearest the viewer is divided by another vane-shaped wall 9 extending radially outwards from the cylindrical wall of the regenerating chamber into a somewhat larger room at the left of the drawing, said room forming the mixing and buffer chamber 10 of the system, and a somewhat smaller room approximately in the center of the drawing, which forms the flocculating chamber 11 of the system. Arranged at the bottom of the mixing chamber at its left hand side is an agitating cushion 12 made of foam plastics, and an air lift pump 13, 13' on the right hand side thereof. The agitator cushion and the air lift pump are both supplied with compressed air from a distributing line 14, supplied from a supply line 15, which in turn is connected to an aerating unit 16, see FIG. 2. The air lift pump 13, 13' is provided at its bottom with a conical plate 17 to ensure that the most advantageous flow conditions are obtained.

A foam plastic agitating cushion 18 is also arranged on the right hand side of the bottom of the flocculating chamber 11, said cushion being supplied with air through the line 19. This arrangement is intended to provide for a slight agitation in the flocculating chamber. The sewage water is intended to be transferred together with the formed floc from the flocculating chamber to the sedimentation chamber 8, where is an opening 20 in the wall 7. The floc is intended to be settled in the chamber 8.

To prevent a direct flow to the spillway 32 of the sedimentation chamber 8 the opening 20 is shielded by means of a plate 21, which is disposed in the centre of the opening 20 of the side of the sedimentation chamber, some distance from the wall 7.

The bottom of the regenerating chamber with the exception of "tooth-gap" portions 22, which are turned to face the sedimentation chamber, is completely covered by an aerating foam plastic aerating cushion 23, to which compressed air is supplied through the pipe 24. The cylindrical wall of the regenerating chamber is provided opposite to the tooth-gap portions 22 with corresponding recesses, which means that the sludge settled on the bottom of the sedimentation chamber 8 can run into the regenerating chamber 5'. Since a uniform and even flow of air upwards in the regenerating chamber is obtained by the aerating cushion 23, the regenerating chamber 8, simultaneously as an intensive aeration of the sludge introduced therein is obtained, acts as one large air lift pump. The introduced regenerating sludge is thus lifted in the regenerating chamber until it passes over the edge of a spillway tube 25, by which the sludge is intended to be returned into the sedimentation chamber 8.

According to the invention regnerated sludge is intended to be transferred from the regenerating chamber to the mixing chamber in quantities which are in proportion to the quantity of sewage water introduced into the mixing chamber through the conduit 26. For this purpose a metering arrangement is arranged between the regenerating chamber and the mixing chamber. The metering arrangement in the shown system is in the form of a tiltable scoop 27 presenting two halves, one large "half" 28 intended to take up inflowing sewage water, and a smaller "half" 29 intended to take up given quantities of regenerated sludge. The scoop 27 is mounted in bearings 30 on the wall of the regenerating chamber. Arranged below the half 28 in the mixing chamber is a coarse screen in the form of a basket 31, for separating coarse impurities and coarse fibrous material. A tube 32 is arranged for aerating the purification system. The system functions in the following manner:

The sewage water enters the system in bursts through the inlet 26, and runs down into the scoop half 28. As is shown in FIG. 2, the regenerating chamber 5' is assumed to be full regenerated sludge and the scoop half 29 is thus immersed in said sludge. As soon as the scoop half 28 is full of sewage water, the double sided scoop tilts and the sludge water and regenerated sludge are emptied into the mixing chamber 10 through the screen 31. The scoop is so designed that the volume of regenerated sludge transferred to the mixing chamber constitutes not more than 10–20 percent by volume of the quantity of sewage water introduced each time by the scoop half 28. Agitation is caused in the mixing and buffer chamber 10 by means of the aerating cushion 12, which ensures that the largest possible surface of the particles of the regenerated sludge is exposed to the sludge in the sewage water. Consequently, the largest possible surface of the sludge is also accessible for adsorption of the dissolved organic impurities in the sewage water. This sequence constitutes the first stage in the activated sludge process according to the invention.

The mixture of sewage water and regenerated activated sludge is pumped by means of an air lift pump 13, 13' from the mixing or equalizing chamber, which is dimensioned so that the same has extra space for accumulating suddenly overflowing sewage water, to the flocculating chamber 11, where the floc is reformed during slight stirring. In this instance the stirring shall only be sufficient to avoid sedimentation.

The mixture passes from the flocculating chamber through the opening 20 in the wall 7 to the sedimentation chamber. The flow of liquid is directed downwards by the plate 21, so as not to disturb the sedimentation.

Subsequent to the sedimentation process the clarified water passes over a spillway 32 and an outlet conduit 33 to the recipient. The spillway determines the liquid level in both the sedimentation and flocculation chambers.

The settled sludge on the bottom of the sedimentation chamber, due to the air lift action in the regenerating chamber 5' is sucked through the openings 22 to said chamber. Incoming sludge is drawn upwards from the tooth-gaps, whilst being aerated constantly. No agitation takes place, since the air cushion 23 is distributed over practically the whole of the bottom of the regenerating chamber. The whole mass of sludge thus moves upwards in the chamber, practically like a piston. The sludge level in the regenerating chamber is kept constant by means of a spillway tube 25, so that the metering scoop 29 is always immersed into the sludge to an equal level and a sufficient extent.

The sludge from the spillway 25 returns to the sedimentation chamber.

Mineralization of the organic constituents is effected in the following manner: The dissolved organic constituents are adsorbed in the mixing chamber on the surface of the active bacteria supplied with the regenerated sludge. After sedimentation and suction of the sediment into the sludge regenerating chamber the organic substances are absorbed by the "bodies" of the bacteria. Subsequent to strong aeration in the sludge regenerating chamber the bacteria are supplied with oxygen through the air bubbles, which also absorb the carbon dioxide $CO_2$, appearing during the process of combustion in the bacteria.

The mineralized organic impurities increase the amount of sludge, which means that surplus sludge, to an amount of approximately ⅓ percent volume of the incoming sewage water, must either be removed continuously or intermittently. This can easily be effected by means of an extra scoop arrangement on the metering scoop.

Although the invention has been described in connection with an embodiment of the same, it is not restricted thereto but can be varied arbitrarily within the scope of the following claims.

What is claimed is:

1. A method for purifying sewage water by means of flocculation comprising:
    (a) feeding sewage water into a flocculation and sedimentation apparatus,
    (b) adding up to 20%, by volume, based on the total volume of sewage water, of regenerated sludge to said sewage water as a flocculating agent,
    (c) allowing the regenerated sludge and sewage water mixture to flocculate and subsequently allowing the sludge to settle out of said mixture, producing recovered sludge and clarified liquid,
    (d) maintaining a body of recovered sludge confined against substantial horizontal translatory motion and aerating the body of recovered sludge with from 20 to 100 m.³/hr. of air by supplying said air uniformly from the bottom throughout substantially the entire extent of the body of said recovered sludge so that a laminar vertical flow of air bubbles proceeds upward through said recovered sludge wherein a large relative movement occurs between said air bubbles and said recovered sludge, thereby converting the impurities in said recovered sludge to carbon dioxide and nitrogen, said carbon dioxide and nitrogen being expelled from the system by said air bubbles, whereby said regenerated sludge is produced, and
    (e) removing from the system both clarified liquid and at least part of said regenerated sludge.

2. A method for purifying sewage water as in claim 1 further comprising:
    (a) removing from the sludge prior to mixing with the sewage water coarse fibrous material which cannot be converted into harmless waste gases,
    (b) adjusting the $Fe(OH)_3$ concentration in the incoming sewage water to at least 20 moles per m.³ of treatment tank, and
    (c) precipitating phosphorous in said $Fe(OH)_3$ as calcium phosphate by adjusting the $Fe(OH)_3$ concentration in the incoming sewage water so that the weight ratio of iron and phosphorous is about 1 to 3 and by maintaining a neutral pH.

3. Apparatus for purifying sewage comprising:
    (a) a treatment tank having a centrally-disposed sludge regenerating chamber,
    (b) surrounding said sludge regenerating chamber within said tank, a mixing chamber, a flocculating chamber and a sedimentation chamber,
    (c) metering means disposed above said mixing and sludge regenerating chambers to regulate the amount of incoming sewage water and regenerated sludge introduced into said mixing chamber.
    (d) means to transport fluid from said mixing chamber to said flocculating chamber,
    (e) means communicating between said flocculating chamber and said sedimentation chamber allowing fluid to flow therebetween,
    (f) aeration means disposed throughout substantially the entire bottom of said sludge regenerating chamber whereby a uniform, laminar vertically-upward flow of air bubbles is produced within said chamber, and
    (g) means communicating between said sedimentation chamber and said sludge regenerating chamber wherein the precipitated sludge in said sedimentation chamber is drawn into said sludge regenerating chamber by the action of the air bubbles, thereby allowing the sludge to be aerated.

4. Apparatus for purifying sewage as in claim 3, wherein said metering means comprises a double-ended, tiltable scoop, the first end of which is adapted to receive incoming sewage water, the second end being immersed in the sludge in said sludge regenerating chamber, the volume of the second end being from ⅓ to ¼ the volume of the first end, wherein as the first end fills up, the scoop tilts and discharges the contents of both ends into said mixing chamber.

5. Apparatus for purifying sewage water as in claim 4, further comprising:
   (a) filtering means disposed below said metering means adapted to remove from said incoming sewage water as the same is introduced into said mixing chamber any coarse impurities or coarse fibrous material therefrom, and
   (b) conduit means adapted to return the regenerated sludge from the top of said sludge regenerating chamber to the bottom of said sedimentation chamber.

References Cited

UNITED STATES PATENTS

| | | | |
|---|---|---|---|
| 3,103,488 | 9/1963 | Griffin | 210—6 |
| 3,195,727 | 7/1965 | Kibbee | 210—195 |
| 3,347,784 | 10/1967 | Kappe | 210—195X |

OTHER REFERENCES

Hurwitz, E., et al., Phosphates—Their "Fate" in a Sewage Treatment Plant—Waterway System, Water and Sewage Works, March 1965, vol. 112, pp. 84–89.

MICHAEL ROGERS, Primary Examiner

U.S. Cl. X.R.

210—6, 11, 197, 221, 256, 519